United States Patent [19]
Simonson

[11] Patent Number: 5,681,135
[45] Date of Patent: Oct. 28, 1997

[54] THREADED FASTENER WITH MULTI-STAGE TORQUE LIMITING APPLICATOR

[76] Inventor: Peter Melott Simonson, 770 Claughton Island Dr., Suite 414, Miami, Fla. 33131

[21] Appl. No.: 504,649

[22] Filed: Jul. 20, 1995

Related U.S. Application Data

[63] Continuation-in-part of Ser. No. 375,142, Jan. 19, 1995, abandoned.

[51] Int. Cl.⁶ .................................................. F16B 31/00
[52] U.S. Cl. ........................... 411/5; 411/14; 411/397; 411/393
[58] Field of Search ....................... 411/1–5, 8, 14, 411/9, 393, 432, 397, 396; 81/473, 475, 476, 459, 53.2

[56] References Cited

U.S. PATENT DOCUMENTS

| | | |
|---|---|---|
| 162,544 | 4/1875 | Franklin . |
| 354,123 | 12/1886 | Flynn . |
| 869,086 | 10/1907 | Hoffman .................. 411/393 |
| 1,082,945 | 12/1913 | Graham .................... 411/393 |
| 1,194,792 | 8/1916 | Stewart . |
| 1,635,895 | 7/1927 | Michelin . |
| 2,371,595 | 3/1945 | Nield . |
| 2,748,824 | 6/1956 | Brill ........................... 411/393 |
| 3,237,507 | 3/1966 | Modrey . |
| 3,460,428 | 8/1969 | Charles . |
| 3,728,933 | 4/1973 | Grube . |
| 3,841,177 | 10/1974 | Watterback . |
| 3,851,386 | 12/1974 | Ellzey ......................... 411/14 |
| 3,886,707 | 6/1975 | Heldt . |
| 4,018,132 | 4/1977 | Abe . |
| 4,253,509 | 3/1981 | Collet . |
| 4,304,503 | 12/1981 | Gehring . |
| 4,317,585 | 3/1982 | Boice ......................... 411/14 |
| 4,324,036 | 4/1982 | Reilly . |
| 4,480,513 | 11/1984 | McCauley . |
| 4,579,531 | 4/1986 | Hinks . |
| 4,653,244 | 3/1987 | Farrell . |
| 4,681,496 | 7/1987 | Fasolino . |
| 4,687,392 | 8/1987 | Bidwell . |
| 4,690,365 | 9/1987 | Miller . |
| 4,723,541 | 2/1988 | Reese . |
| 4,729,707 | 3/1988 | Takahashi . |
| 4,786,201 | 11/1988 | Huetter . |
| 5,116,337 | 5/1992 | Johnson . |
| 5,122,133 | 6/1992 | Evans . |
| 5,165,831 | 11/1992 | Yager ......................... 411/14 |
| 5,226,765 | 7/1993 | Walton . |
| 5,261,910 | 11/1993 | Warden . |
| 5,347,894 | 9/1994 | Fischer . |
| 5,375,956 | 12/1994 | Pennig . |

*Primary Examiner*—Flemming Saether
*Attorney, Agent, or Firm*—Quarles & Brady

[57] ABSTRACT

A fastener system includes an applicator for engagement by a tool, and a fastener such as a screw having a first surface with first screw threads in a one hand direction for engaging a workpiece. An attachment mechanism is provided to transfer rotational force from the applicator to the fastener and has second and third screw threads in an opposite hand direction to the first screw threads. The second and third screw threads are interfaced to establish a torque of the predefined magnitude prior to the fastener being attached to the workpiece. When the torque applied by the tool exceeds the predefined magnitude, the attachment mechanism begins to unthread and further application of torque from the tool to the fastener ceases, thereby controlling the applied torque to no greater than the predefined magnitude. The attachment mechanism can be used in a variety of applications including flush mounted heads, shallow aperture installations and multistage torque mountings.

6 Claims, 2 Drawing Sheets

THREADED FASTENER WITH MULTI-STAGE TORQUE LIMITING APPLICATOR

This application is a continuation-in-part of U.S. patent application Ser. No. 08/375,142, filed Jan. 19, 1995 now abandoned.

FIELD OF THE INVENTION

The present invention relates to mechanisms that control the magnitude of torque that can be transmitted between two members to less than or equal to a predetermined magnitude; and more particularly to torque calibrating mechanisms incorporated in threaded fasteners that allow the fastener to be removed or and/or reused even after the torque limit has been reached and the fastener is secured.

BACKGROUND OF THE INVENTION

In orthopaedic procedures, two or more brackets may need to be attached using threaded bolts and clamps to secure portions of the spine in a fixed position. Care must be taken that excessive amounts of torque are not applied to the fastening devices. Excessive torque can weaken the device or compromise the connection in an undetected manner, causing the fastener to fail at some subsequent point in time following the surgical procedure. It is also critical that predetermined, minimum torque levels are met to achieve mechanical integrity and prevent premature loosening.

As a consequence, it is desirable to provide a variety of fastening mechanisms for used in surgery that include an integral torque control mechanism that does not require special tools.

It is also important in many surgical environments to have a fastener that flush mounts to the underlying surface. It is therefore desirable to provide torque control in a flush mountable fastener that is non-destructively removable.

SUMMARY OF THE INVENTION

A general object of the present invention is to provide an apparatus for transferring rotational force from one member to another wherein the apparatus incorporates an integral mechanism for limiting the transferred torque to less than a predefined magnitude.

Another object is to provide such an apparatus which may be incorporated into a fastener to ensure that a minimum torque is established while attaching the fastener without exceeding the predefined torque magnitude.

A further object of the present is to provide a threaded fastener system in which the torque limiting mechanism can also be used for subsequent removal of the fastener from the underlying substrate.

Yet another object of the invention is to provide a threaded fastener with an integral, non-destructive torque limiting mechanism. Such a mechanism allows the fastener to be applied without special tools, and reused in a predetermined manner even after the torque limit has been exceeded during a first fastening operation, preferably utilizing the same tool or mounting member.

A still further object of the invention is to provide torque control in a fastener that is capable of flush mounting to the underlying surface.

Another object of the invention is to provide a torque control system for a fastener that can also provide field security against unauthorized removal.

These objects and other objects of the invention are fulfilled by an apparatus that includes a first member having an aperture with screw threads formed therein and a second member having a shaft with screw threads that mate with the threaded aperture of the first member. The first and second members are used to transfer rotational force between them in a direction that tends to unthread the two members. Before use in transferring force, the first member and second member are tightened together or otherwise engaged to establish an interactive torque of a predefined magnitude. Therefore, when torque applied between the first and second members meets or exceeds the predefined magnitude, the two members unthread and the torque transfer effectively terminates.

This torque controlling concept has particular application to threaded fasteners, such as screws, bolts and nuts, for example, to prevent the fasteners from being over-tightened or under-tightened into a workpiece.

In one embodiment, the first member with the internal threads can provide, at an opposite end, external threads for engaging the underlying workpiece with have an opposite hand to the internal threads. This first member can serve as the fastener for securing to an underlying surface or connecting two or more components, second member has external threads corresponding to the internal threads of the first member. The second member can serve as an applicator member for driving the first member until the predetermined torque is reached and the applicator threads of the two members begin to disengage. When that torque exceeds the predefined magnitude, the coupling mechanism yields by unthreading to inhibit the transfer of excessive torque to the fastener body. This threaded interface can also ensure that a minimum desired or required torque is established prior to unthreading of the applicator.

In this embodiment, the first member can provide an internal thread so that the head or top of the member can be flush with the underlying surface when mounted. Further, the second member can be used to remove the first member in a reusable, non-destructive manner. Thus, this embodiment of the invention permits torque regulated securement with a flush mounting and allows non-destructive removal using the same tool. The attachment mechanism of the invention also provides advantages over shear type torque limiters, including not only reusability but also the avoidance of erroneous moments created by off axis bending of the constricted shear section, which can lead to variations in torque applied to the mounted fastener.

The attachment mechanism of the invention also takes advantage of the relative forces of the static frictional engagement between the applicator and the fastener and the dynamic frictional engagement between the fastener and the workpiece.

In surgical applications, it is important to ensure positive connection between the fastener and the mounting or dismounting tool to avoid accidental loss of the fastener within the body cavity. This is an inherent feature of the threaded connection that controls torque. This positive engagement of the first embodiment can be further enhanced by forming the internal thread surface of the first member/fastener in a conical or tapering geometry. The tapering geometry provides for a more rapid separation of the bodies upon unthreading of the two members. Additionally, the concavity can serve as a self-centering guide during insertion for retrieval.

In applications where flush mounting is not required, the torque regulating system can be constructed in an alternative embodiment in which the torque controlling threaded surfaces may be of opposite genders.

In addition to providing predetermined torque control, this embodiment provides a larger, external interface surface for transmitting greater torque and compressive mounting forces. Because the diameter of the threads on the second member that actually mount to the underlying surface is smaller than the diameter of the mating threads that interface with the applicator, the applicator is capable of imparting greater torque to the mounting threads with the larger diameter gripping surface. Also, the external surface allows the mounting tool to impart a greater axial compressive force for mounting the fastener to the underlying substrate.

Thus, a small number of threads can be used for mounting and the associated orifice and the underlying surface can be correspondingly shallow. This construction has significant application in surgical environments, for example, in which the size of the components is very small and necessitates shallow yet positive and secure engagement of threaded components.

According to a further aspect of the invention, the mating threads between the first member and the second member can be formed in a proprietary pitch that is not readily matched by threaded tools. In this way, the threads can provide security in the field against unauthorized removal and/or fastener reuse when the torque regulating fastener is used, for example, to externally mount covers on housings and the like.

The torque calibrating system of the invention can also be utilized for mounting nuts on threaded studs or bolts. The nut can be externally threaded in an opposite hand to an integral mounting thread. The external thread is positioned in an applicator tool to a torque level predetermined to release when the nut is tightened on the underlying bolt or stud to the desired torque.

The external thread can have a proprietary pitch for field security and can be used to subsequently remove the nut with a matching tool. The pretorque attachment mechanism can also be used to deter reuse of removed fasteners, for example, to prevent reinsertion of fatigued bolts. The torque established between the applicator and the fastener is uncalibrated upon removal and should dissuade the user from reapplying the same, used bolt without a known, predetermined torque, which is available through a new fastener and applicator assembly having an established, preset release torque.

In addition to providing a tamper resistant, pretorqued mounting, the nut can also provide a base for mounting an additional threaded member, such as an additional structural or mounting bracket, on its external thread.

The torque controlling system of the invention can also be applied in multistage fashion to permit sequential application of progressively increasing torque levels. In an exemplary embodiment, a threaded, flush mountable bolt may be attached to a first applicator member having an external thread mounted to an internal thread of the bolt. According to the invention, the mating threads have an opposite hand to the external thread of the bolt. The first applicator member in turn has an external thread for receiving second applicator member.

The threaded interface between the first applicator and the second applicator are in the same hand as the interface between the first applicator and the bolt to be mounted. However, the pretorque between the first applicator and the second applicator is less than the pretorque between the first applicator and the bolt to be mounted. The application of the bolt using the multistage system first results in a first level of tightening until the second applicator member releases and is removed. Next, the first applicator member is directly accessed and turned until the second and final level of torque is achieved.

This progressive approach can be used, for example, to obtain a provisional tightness of a bolt while other bolts are being mounted elsewhere on a surgical appliance. Once all bolts are in place and the appliance is accurately positioned. The remaining applicator can be used to obtain the final torque level desired.

This multistage application can be used with a plurality of applicators to provide two, three or more stages of torque level.

The torque control system of the invention can also be used to provide a selectable torque applicator. In one embodiment, the edges of the member to be mounted can be etched or marked with a series of position indicators. The applicator can include a marker that is lined up with one of the position indicators as the applicator is pretightened to the member, with each position indicator corresponding to a pretorque value. The user can select the level of torque by selecting the level of pretorque between the applicator and the member to be mounted as a predetermined level of torque is achieved.

Thus, the torque control system of the invention provides a mechanism for ensuring reliable yet removable mounting of threaded fasteners. The system can be enhanced to provide flush mounting, field security, and progressive multistage torque for use in a variety of applications.

DETAILED DESCRIPTION OF THE INVENTION

The fastener and torque calibrating system of the invention has particular application in surgical implant and orthopaedic fixation environments. The following detailed description is therefore directed to exemplary applications to surgical appliances with threaded posts and rod-screw connectors for linking spinal implants and the like. It should be understood, however that the invention is not limited to these particular embodiments and can have other applications.

Figure 1:
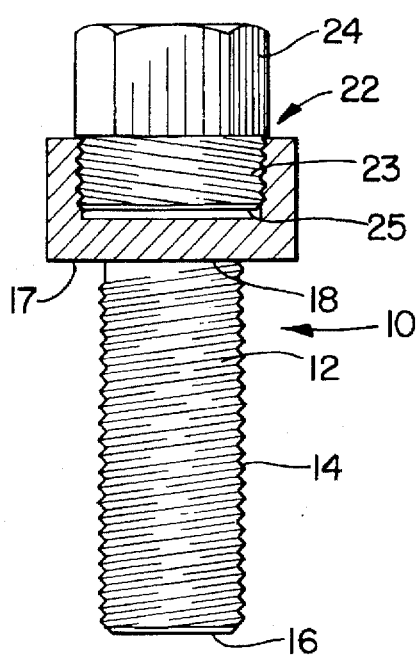
FIG. 1 illustrates a fastener with an attachment mechanism according to the invention.

With initial reference to FIG. 1, a surgical screw 10 is adapted for use in fastening or connecting orthopaedic devices. The screw 10 has a constant diameter shaft portion 12 with screw threads 14 formed helically there around. The threads 14 are formed in a right-hand direction so that when an end 16 of the shaft portion 12 is inserted into an aperture of an underlying substrate, such as a clamp or other appliance, and the shaft portion is turned in a clockwise direction, the threads 14 will draw the screw 10 into the aperture. An opposite end 18 of the shaft portion 12 can have a shoulder 17 which restricts the depth to which the screw 10 can be drawn into the aperture.

An attachment mechanism 22 can be used with a tool, such as a wrench (not shown), to drive the screw 10 into the aperture. The attachment mechanism 22 includes an applicator 24. The screw 10 can have a centrally located aperture 25 with left-hand screw threads 23 that mate with the screw threads on the applicator 24.

The applicator 24 can have a grippable outer surface, such as a hexagonal outer surface, which can be engaged by a conventional tool, such as a hexagonal nut driver or wrench. Prior to usage, the attachment mechanism 22 is assembled by threading the applicator 24 into the aperture 25 of the screw 10. The two components 24 and 10 are engaged together to a predefined torque by the assembler, thereby preloading the attachment mechanism 22.

The predefined torque magnitude is selected so that when that amount of force is applied through the attachment mechanism 22, the screw 10 will be securely fastened into the substrate and will not loosen under normal conditions. The predefined torque magnitude also is preferably less than a level at which the screw 10 could break off or damage the hole while being inserted.

The predefined torque can be established by a variety of techniques. While a tightening approach has been discussed, the torque can be established by other means, such as an adhesive or other chemical engagement, clean, struck, mismatched or otherwise distorted or tapered threads; locking washers; and surface or temperature treatments.

During a surgical procedure, the attachment mechanism 22 is threaded to the predetermined torque. A surgeon then inserts the end 16 of the screw 10 into a mating hole of an implant or the like. A hexagonal nut driver or similar tool (not shown) can be used to turn the applicator 24 in a clockwise direction, thereby driving the screw 10 into the hole. The driving continues until the screw 10 reaches the bottom of the hole or extends into the hole to the point where the shoulder 17 abuts a surface, stopping further penetration of the screw 10.

If the tool is operated thereafter to exert force on the applicator 24 which exceeds the predefined torque loading between the applicator 24 and the screw 10, the attachment mechanism 22 yields, preventing excessive torque from being applied to the screw 10. Specifically, torque in excess of the preloading magnitude causes the applicator 24 to unthread from the screw 10 because the left-hand threads 23 used to couple the two components of the attachment mechanism 22 are counter to the direction of the threads 14 which draw the screw 10 into the hole. As a result, the surgeon is unable to apply torque to the screw 10 that exceeds the torque magnitude used to preload the attachment mechanism 22 when assembling the applicator 24 and the screw 10. Furthermore, the attachment mechanism 22 yields only after the screw 10 has been seated in the hole with sufficient torque prescribed to ensure that the screw 10 will not come loose under normal conditions. The construction of the attachment mechanism also diminishes the effects of off-axis moments during tightening process.

Once the screw 10 has been properly seated, the applicator 24 can be removed. The applicator 24 can be thrown away or reassembled by torque preloading for reuse with another screw. This reuse feature can be implemented for waste management and inventory control wherein the used applicators are returned to a manufacturer of the fasteners to indicate the number of fasteners used by the customer and provide components for new units.

The screw 10 can also serve as a flush mount fastener because the attachment mechanism 22 is embodied within an internal aperture 25 of the head of the screw 10. Thus, if the underlying hole is formed to receive the head of the screw 10, a flush surface can be provided when the applicator 24 is removed.

The applicator 24 also provides a mechanism for reliably are non-destructively removing the screw 10, even in flush mounted applications. Because of the opposite directions of the threads 14 and 23, the counter-clockwise rotation of the applicator 24 tightens the engagement of the attachment mechanism 22, while unthreading the screw 10 from the underlying substrate. The positive, threaded engagement of the attachment mechanism 22 also securely captures the screw 10 to avoid in the patients' body cavity inadvertent los of the screw 10, during retraction.

The fastening system of the invention eliminates a need for special surgical tools, such as a torque wrench, and permits the screw to be reused since the torque calibrating mechanism is non-destructive. This is accomplished by a threaded torque transfer coupling that has opposite hand threads to those on the fastener which engage the workpiece. Although the threads 14 on screw 10 are right-hand direction threads and the threads between applicator 24 and the screw 10 are left-hand direction threads, the direction of the respective threads on these components could be reversed as long as the threads between the applicator 24 and screw 10 are of opposite hand direction to those which engage the workpiece.

It is particularly important during surgical procedures to ensure that a positive connection exists between the fastener and the mounting or dismounting tool to avoid accidental loss of the fastener or screw within the patient's body cavity. This feature is provided by the threaded connection that controls torque as discussed above.

Figure 2:
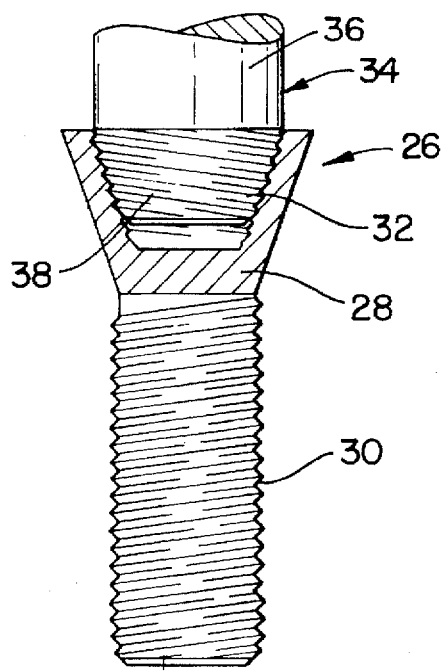
FIG. 2 shows an alternative embodiment of a fastener utilizing the attachment mechanism of the invention in a conical geometry.

It is also of assistance during surgery if the applicator quickly disengages after performing its function and is easily reattached for dismounting when the fastener or screw is to be removed. Referring to FIG. 2, this prompt release as well as a locating and centering function can be provided by a conical or tapering geometry in an attachment mechanism 26.

A screw 28 can provide external threads 30 for securing to the underlying substrate (not shown) in a given direction, in this case, a right-hand direction. The interfacing threads 32 of the attachment mechanism 26 can be provided on an internal surface of the screw 28 in a tapering geometry, such as a conical geometry. The applicator 34 can be formed as the shaft 36 of a tool, such as a wrench, screwdriver, and even robotic arms.

Prior to insertion in the patient, the screw 28 is mounted onto the applicator 34 to a predetermined torque corresponding to the torque level desired for the mounting threads 30. Upon insertion of the screw 28 into the underlying aperture, the applicator 34 releases once the desired torque level is reached. Because of the conical geometry, it is not necessary for the applicator 34 to be rotated through all revolutions of the threads 32 provided by the conical interface. Thus, rapid withdrawal is possible.

When the screw 28 is to be removed, the tapered geometry of the applicator threaded head 38 can be used to quickly locate the aperture and promptly center the threads 32 for withdrawal of the screw 28. This feature can be particularly beneficial during surgical procedures in which the viewing of the screw 28 may be obscured.

Figure 3:
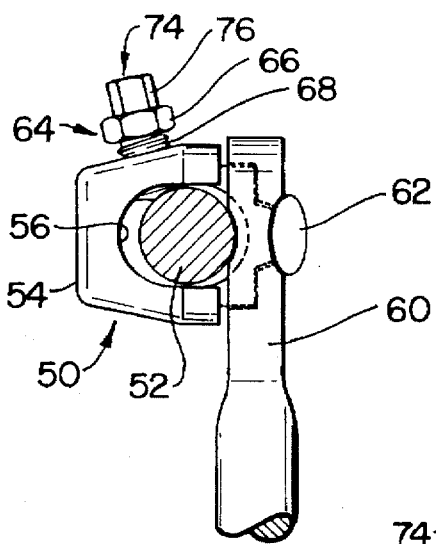
FIG. 3 is a side view of a clamp of an implantable spinal brace which utilizes a screw having an attachment system according to the invention.

Referring to FIG. 3, the present torque controlling concept can be used with various types of fastening devices, such as a rod clamp 50 for an implantable orthopaedic appliance. The particular clamp 50 illustrated in FIG. 3 is used to attach components of a spine brace to a rod 52 that extends along the spine. In the present example, the clamp 50 has a main body 54 with an elliptical aperture 56 therethrough that receives the rod 52. One side of the body 54 has a post that extends through a hook 60. A head 62 on the post holds the hook 60 on the clamp 50.

Figure 4:
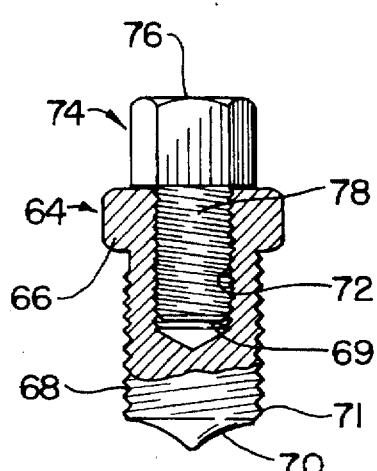
FIG. 4 is a cross-sectional view of the screw used in the clamp of FIG. 3.

The clamp 50 is attached to the rod 52 and the other components are held in place by a fastening screw 64 which is shown in greater detail in FIG. 4. The screw 64 can comprise a hexagonal head 66 with a cylindrical threaded shaft 68 extending therefrom and terminating in a tapered tip 70. The screw 64 is threaded into a hole on one side of the clamp body 54 and extends through the hole so that the tapered tip 70 presses against the rod 52. The screw 64 exerts pressure between the clamp body 54 and the rod 52, pushing the rod against the hook 60 so that the hook 60 is forced against the head 62. The force from screw 64 holds the clamp, rod and hook in a secure position.

One of the concerns with these types of clamps is that the proper amount of torque be applied to the screw 64. It is important that the screw 64 be tightened to a secure torque level without over-tightening. The screw 64 must be sufficiently tightened to avoid loosening during use inside the patient. However, because of the relatively small size of the screw 64 and clamp 50, care must be taken not to over-tighten, which may cause stripping or other damage that can undermine the integrity of the engagement.

The clamp screw 64 illustrated in FIGS. 3 and 4 incorporates the present integral torque limiting concept. Specifically, a threaded aperture 72 extends longitudinally in the head 66 of the screw 64. Screw threads 69 in the aperture 72 are formed in the opposite direction to the thread 71 on the exterior of the cylindrical shaft 68 of the screw 64. That is, if conventional right-hand direction screw threads 71 are formed on the exterior of the cylindrical projection, left-hand screw threads 69 are formed in aperture 72. A fastening applicator 74 is inserted into aperture 72 of the clamp screw 64. The applicator 74 has a head 76 with a hexagonal cross section and a shaft 78 extending from the head 76.

Prior to a surgical procedure, the applicator 74 is inserted into the screw 64 and tightened to a predetermined torque magnitude which preloads the two components to provide a torque limit. The torque limit is chosen so that the components will yield when the screw 68 applies sufficient force against the rod 52 to hold the clamp 50 securely on the rod 52, yet before excessive torque is applied.

The surgeon then inserts the screw 64 into the clamp 50 and can apply, for example, a conventional hexagonal nut driver (not shown) to the head 76 of the applicator 74. The nut driver then turns the applicator 74 and screw 64 into the clamp 50 until the torque limit is reached, at which point the torque limit mechanism yields, whereby further turning of the driver in the same direction results in the applicator 74 unthreading from the aperture 72 in the screw 68. Thus, when the torque limit is exceeded, the screw 68 no longer turns within the clamp hole. The applicator 74 is removed fully prior to closure of the surgical incisions in the patient.

If the surgeon needs to remove the screw 64, a larger nut driver or wrench can be applied to head 66 to back the screw out of the hole in the clamp body 54, or the applicator 74 can be re-screwed in the opposite direction to remove the screw 70.

Figure 3A:
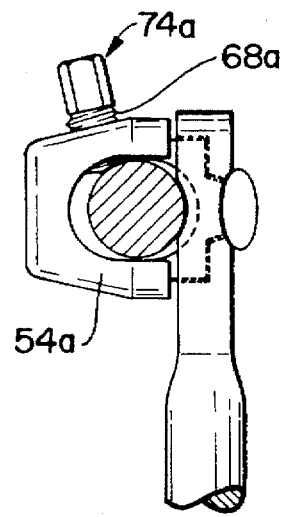
FIG. 3a is a side view of a clamp of an implantable spinal brace which utilizes an alternative, flush mountable screw having an attachment system according to the invention.

Referring to FIG. 3a, the flush mountable attachment mechanism of the invention can be utilized to eliminate the hex portion on head 66 (FIG. 37) altogether, permitting a smoother and possibly flush surface. In this embodiment, the applicator 74a joins the screw 68 at a junction substantially flush with the top of the clamp body 54a.

Figure 5:
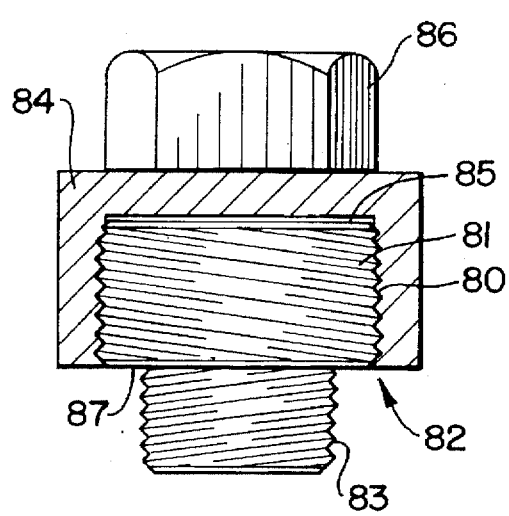
FIG. 5 depicts another embodiment of a fastener having external threads for use with the attachment mechanism according to the invention.

Referring to FIG. 5, in applications in which flush mounting is not required, the torque regulating system can be constructed in an alternative embodiment in which the torque controlling thread surfaces 80 are provided externally on the head 81 of the screw 82. In addition to providing predetermined torque control, this embodiment provides a larger external interface surface at the threads 80 for transmitting greater torque and compressive mounting forces. Because the, diameter of the threads 83 on the screw 82 that actually mount to the underlying surface (not shown) is smaller than the diameter of the interfacing threads 80 that mate with the applicator 84, the applicator 84 is capable of imparting greater torque to the mounting threads 83 with the larger diameter gripping surface at the threads 80. Also, the external surface of the threads 80 allows the applicator 84 to impart a greater axial compressive force for mounting the screw 82 to the underlying substrate.

Thus, a small number of the threads 83 can be used for mounting in the associated orifice, and the underlying surface can be correspondingly shallow. This construction has significant applications in surgical environments, for example, in which the size of the components is very small and necessitates shallow, yet positive and secure engagement of threaded members.

The screw 82 can provide the mounting threads 83 in a given direction, in this case, right hand threads, and a head bearing the external surface having interface threads 80 in an opposite direction, in this case, left hand threads.

The applicator 84 can provide an aperture 85 having threads that mate with the interface threads 80 of the screw 82. The applicator 84 can provide a grippable head, such as a hexagonal head 86, for engagement with a wrench or other driving tool (not shown).

In use, the applicator 84 is prethreaded onto the head of the screw 82 to a predetermined torque value corresponding to the desired torque calibration for the screw threads 83. The screw threads 83 are inserted into the orifice of the underlying surface until the screw 82 bottoms out in the orifice or the abutment surface 87 engages the top surface adjacent the orifice. Tightening continues until the predetermined torque is reached, at which point the applicator 84 unscrews from the head of the screw 82.

The externally threaded head can be used as a stud for mounting other threaded components. Additionally, the applicator 84 can be remounted for removal of the screw 82. In this application, the tightening of the applicator 84 onto the interface threads 80 increases the securement during the removal process while unthreading the oppositely directed threads 83 of the screw 82 from the underlying substrate.

Figure 6:
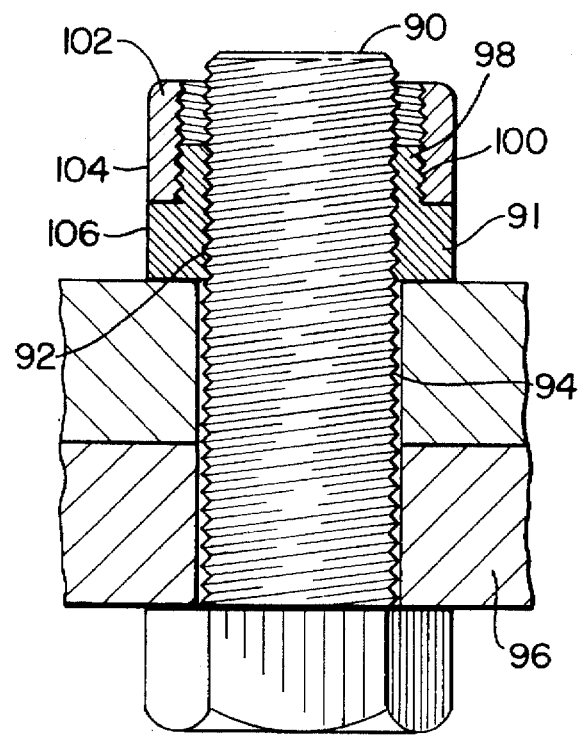
FIG. 6 depicts yet another embodiment of a fastener utilizing the attachment mechanism according to the invention in a nut.

Referring to FIG. 6, the attachment mechanism according to the invention can be utilized to secure a nut 91 on a stud post or bolt 90 to a predetermined torque level or limit. The nut 91 can provide internal threads 92 that mate with the threads 94 of the bolt 90 used to secure a plate 96 or other structure. The bolt threads 94 can be formed in a given direction, in this case right-hand threads, which mate with the right-hand threads 92 of the nut 91.

As part of the attachment mechanism, the nut 91 can provide an extension 98 that provides on its external circumferential surface a series of threads 100 in a direction opposite to the threads 92, 94 of the bolt 90 and internal surface of the nut 91. Alternatively, the threads 100 can be provided on an internal surface (not shown) axially spaced from the threads 92. These threads 100 mate with an applicator 102. The applicator 102 illustrated provides a grippable surface, such as a hexagonal surface 104, for engagement by a wrench or other tool. Alternatively, the applicator 102 can be provided On the shaft of a tool, such as robotic or mechanized arm.

Prior to use, the applicator 102 can be pretightened onto the nut 91 to a torque level corresponding to the level desired for tightening of the bolt 90 and the nut 91. The nut 91 can be threaded onto the bolt 90 and tightened until the desired torque level is reached, at which time the applicator 102 is released and unscrews from the external threads 100 of the nut extension 98.

For later removal of the nut 91, the applicator 102 can be rethreaded, whereby a Continuing, tightening engagement of the applicator 102 to the nut 88 results in a counterclockwise rotation and removal of the nut 91 from the bolt 90.

The nut 91 can be used, for example, as an external fastener for a housing. In some circumstances, it may be desired to restrict access to the interior portions of the housing by making it difficult to remove the nut 91. Accordingly, the external threads 100 can be provided at a proprietary pitch which is not readily duplicated by a conventional threaded tool. Thus, unauthorized persons are deterred or inhibited from removing the nut 91. The lower surface 106 of the nut 88 can be provided with a smooth, non-grippable surface 106 to prevent access by a wrench.

Alternatively, if access is permitted, the lower surface 106 can be provided with a grippable surface, so that later removal does not necessarily require use of the original applicator 102.

This embodiment of the invention can be utilized to provide a system of predetermined torque levels so that the user can select a nut with the desired torque level for mounting to a bolt. In this regard, a series of applicator nut pairs can be provided, each having a preset torque level identified on the pair. The user then selects the appropriate torque level pair and utilizes it with a bolt to achieve the desired level of tightening.

Figure 7:
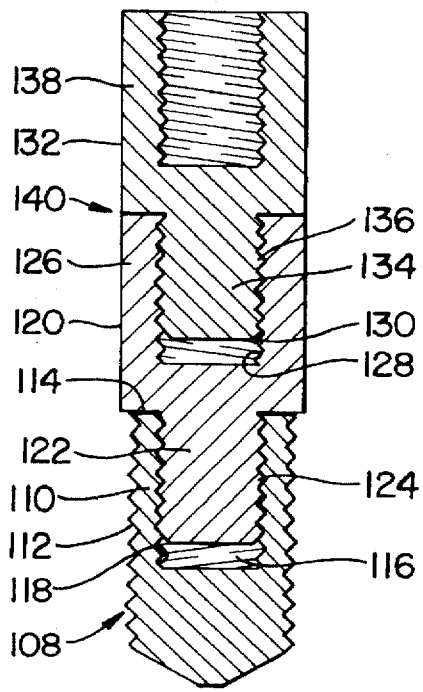
FIG. 7 is a cross-sectional view of another embodiment of a screw in which two different torque limits may be selected or provided by a user using the attachment mechanism of the invention.

FIG. 7 illustrates an alternative embodiment utilizing the torque limiting feature of the invention in multistage fashion to provide progressively increasing torque to a fastener. A threaded flush mountable screw 108 can have a cylindrical body 110 with right-hand threads 112 cut in its exterior surface which engage a threaded hole in an underlying substrate. The top end 114 of the screw 108 has a central aperture 116 with left-hand threads 118.

A first applicator 120 has a cylindrical projection 122 with external left-hand threads 124 that engage the threads 118 in aperture 116 of the screw 108. The exposed portion 126 of first applicator 120 can have a hexagonal cross-section for engagement by a wrench (not shown). Prior to insertion of the fastening screw 108 into a workpiece, the first applicator 120 is tightened into the screw 108 to a first predefined torque magnitude. The end of the first applicator 120 that is opposite to the cylindrical projection 122 has an aperture 128 with left-hand threads 130.

A second applicator 132 has a cylindrical projection 134 with left-hand threads 136 that engage the threads 130 in aperture 128 of the first applicator 120. The exposed portion 138 of the second applicator 132 can also have a hexagonal cross-section for engagement by a wrench. Prior to insertion of the fastening screw 108 into a workpiece, the second applicator 132 is tightened into the first applicator 120 to a second predefined torque magnitude, which is less than the first predefined torque magnitude.

The attachment mechanism 140 comprising dual applicators 120 and 132 can allow the installer to select which of the two predefined torque magnitudes to use as the torque limit for attaching the screw 108. In this way, if the installer desires the greater, first torque magnitude, a wrench is placed to engage the first applicator 120. This allows the screw 108 to be driven until that first torque magnitude is exceeded. Thereafter, the first applicator 120 breaks loose and begins unthreading from the screw 108. If the lesser, second torque magnitude is desired as the limit, the wrench engages only the second applicator 132.

This progressive multistage approach can also be used, for example, to obtain a provisional tightness of the screw 108 while other similar screws are being mounted elsewhere on a surgical appliance. With this provisional tightness, a plate or other appliance, for example, may be manipulated against the slight frictional resistance provided by the provisional tightness. Once the screws are in place and the appliance is accurately positioned, a final torque level can be achieved utilizing the first applicator 120. This multistage application can be used with a plurality of applicators to provide two, three or more stages of progressive torque level.

Figure 8:
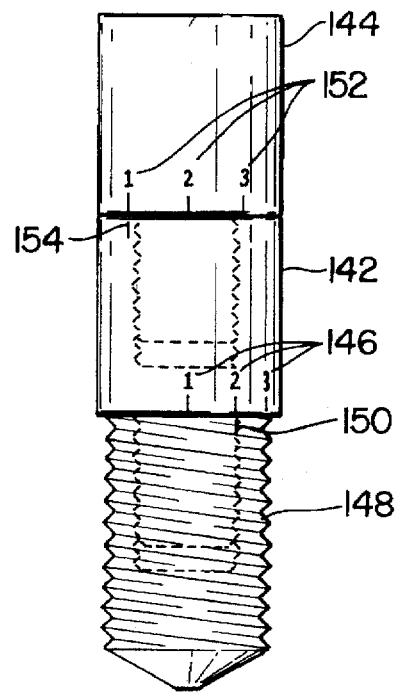
FIG. 8 is a side view of the screw illustrated in FIG. 7, showing selection indicators for controlling the level of torque provided by the attachment mechanism of the invention.

Referring to FIG. 8, the attachment mechanism of the invention can be utilized with a series of applicators 142, 144 having indicators for selecting the level of torque desired. This feature of the invention is illustrated in connection with a multistage applicator, but can be used equally well with a single stage applicator.

The first applicator 142 can provide a series of indicators, such as laser etchings 146, that correspond to a position of the first applicator 142 relative to the screw 148 when a predetermined tightness is achieved. The user obtains this relative position and the associated predetermined tightness by matching an indicator 146 with a marker 150 on the screw 148. The indicators 146 can be labeled with various units, including actual torque levels or numbers, colors or other indicia coded to refer to torque levels.

Similarly, the second applicator 144 can provide a series of indicators 152 that correspond to the relative position of the second applicator 144 and the first applicator 142. The user can select the torque level by lining up an indicator 152 with a marker 154 on the first applicator 142.

In the illustrated example, the first applicator 142 is set to a desired torque level "2." The second applicator 144 is set to a lower, provisional torque level "1." In use, the screw 148 is inserted into a workpiece, and the second applicator 144 is manipulated until the torque level "1" is reached, at which time the second applicator 144 releases from the first applicator 142 and is removed. After positioning of the plate or other preliminary activity, the first applicator 142 is manipulated to implement the final torque level, which is indicated on the first applicator 142 as "2."

The torque level indicators 144, 152 can be employed by the user to reset the-desired torque level for subsequent use.

Although specific embodiments of the invention have been set forth with a relatively high degree of particularity, it is intended that the scope of the invention not be so limited. Instead, the proper scope of the invention may include alternatives which are now within the purview of one skilled in the art. For example, the fasteners and applicators of the invention can be constructed with any of a variety of materials, which may include steel, titanium, aluminum, brass, polymers, woods and plastics. The materials can be selected in various combinations for different operating characteristics. The attachment mechanism can also be applied to fasteners of various sizes. Thus, the scope should be ascertained by a reading of the claims that follow.

I claim:

1. A fastener system for attaching a fastener to a workpiece and limiting an amount of torque which can be applied to the fastener by a tool, said fastener system comprising:

a fastener body having a first surface with first screw threads in a first hand direction for engaging the workpiece;

a first applicator removably engaging the fastener body to apply rotational force to said fastener body, and having a second surface with second screw threads in a second hand direction opposite the first hand direction; and a second applicator configured for engagement by the tool to apply rotational force to said second applicator by the tool, and having a third surface with third screw threads in the second hand direction for engaging the second screw threads on said first applicator and tightened together with the second screw threads to a torque of a predefined magnitude prior to said fastener being attached to the workpiece.

2. The fastener system according to claim 1, wherein said second applicator bears a series of position indicators and said first applicator bears a marker for lining up selectively with one of the position indicators, the lining up of a position indicator with the marker corresponding to a torque level between the first applicator and the second applicator, wherein the user can select the level of torque by aligning one of the position indicators with the marker.

3. A fastener for attaching to a workpiece and limiting an amount of torque which can be applied to the fastener by a tool, said fastener comprising:

a fastener body having a first surface with first screw threads in a first hand direction for engaging the workpiece, and having a second surface with second screw threads in a second hand direction;

a first applicator configured for engagement by the tool to apply rotational force to said first applicator, and having a third surface with third screw threads in the second hand direction with the third screw threads engaging the second screw threads on said fastener body and tightened together to a torque of a first predefined magnitude prior to said fastener being attached to the workpiece, said first applicator further having a fourth surface with fourth screw threads in the second hand direction; and a second applicator configured for engagement by the tool to apply rotational force to said second applicator, and having a fifth surface with fifth screw threads in the second hand direction, with the fifth screw threads engaging the fourth screw threads on said first applicator and tightened together to a torque of a second predefined magnitude prior to said fastener being attached to the workpiece.

4. The fastener as recited in claim 3, wherein the torque of the first predefined magnitude is greater than the torque of the second predefined magnitude.

5. Apparatus for limiting an amount of torque in a given direction of rotation to a predefined magnitude, said apparatus comprising:

a first member having a first surface with first screw threads formed thereon; and a second member having a second surface with second screw threads formed thereon, wherein the second screw threads are in engagement with the first screw threads and said first member and said second member are engaged together to provide a torque of predefined magnitude;

said first and second screw threads being formed in a first hand direction such said second member separates from the first member when a torque that exceeds the predefined magnitude is applied in the given direction of rotation between the first and second members, said second member having third screw threads for engaging a workpiece, said third screw threads having a larger diameter than said second threads and being formed in an opposite hand direction than said second screw threads, further comprising a third member having a fourth surface with fourth screw threads formed thereon;

said first member having a fifth surface with fifth screw threads formed thereon, wherein the fifth screw threads are in engagement with the fourth screw threads and said first member and said third member are engaged together to provide a second torque of predefined magnitude;

said fourth and fifth screw threads being formed in the first hand direction such said first member separates from the third member when a torque that exceeds the second torque of predefined magnitude is applied in the given direction of rotation between the first and third members, said second torque of predetermined magnitude being less than said torque of predetermined value.

6. The apparatus as recited in claim 5, wherein said third screw threaded are formed on a shaft of a fastener for engagement in a workpiece and said second screw threads are formed in an aperture in an end of the fastener.

* * * * *